United States Patent
Wakabayashi et al.

(10) Patent No.: US 11,880,336 B2
(45) Date of Patent: Jan. 23, 2024

(54) TRACKING TECHNIQUES FOR GENERATED DATA

(71) Applicant: INTERNATIONAL BUSINESS MACHINES CORPORATION, Armonk, NY (US)

(72) Inventors: Takehiro Wakabayashi, Tokyo (JP); Shingo Nagai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 17/654,262

(22) Filed: Mar. 10, 2022

(65) Prior Publication Data
US 2023/0289323 A1    Sep. 14, 2023

(51) Int. Cl.
| | |
|---|---|
| *G06F 16/00* | (2019.01) |
| *G06F 16/11* | (2019.01) |
| *G06F 21/60* | (2013.01) |
| *G06F 16/23* | (2019.01) |

(52) U.S. Cl.
CPC ........ *G06F 16/125* (2019.01); *G06F 16/2358* (2019.01); *G06F 21/60* (2013.01)

(58) Field of Classification Search
CPC .... G06F 16/125; G06F 16/2358; G06F 21/60; G06F 16/1734
See application file for complete search history.

(56) References Cited

U.S. PATENT DOCUMENTS

| | | | | |
|---|---|---|---|---|
| 2008/0077988 | A1* | 3/2008 | Small | G06F 11/3476 726/22 |
| 2008/0281485 | A1* | 11/2008 | Plante | H04N 21/2747 701/33.4 |
| 2011/0131225 | A1* | 6/2011 | Mayer | G06Q 10/06 707/E17.014 |
| 2017/0372226 | A1* | 12/2017 | Costa | G06F 21/6245 |
| 2018/0052898 | A1* | 2/2018 | Allan | G06F 16/435 |
| 2019/0325276 | A1* | 10/2019 | Fu | G06N 3/084 |

(Continued)

OTHER PUBLICATIONS

Considerations for Sensitive Data within Machine Learning Datasets, https://cloud.google.com/architecture/sensitive-data-and-ml-datasets. Retrieved from the internet on Oct. 22, 2021.

(Continued)

*Primary Examiner* — Alexander Khong
(74) *Attorney, Agent, or Firm* — Donald J. O'Brien

(57) ABSTRACT

An apparatus, a method, and computer program product are provided that tracks data for, and generated by, machine learning for accurate and precise deletion. The method includes receiving a dataset for use in training a machine learning model and registering a file from the dataset into a reference table, wherein the file is designated for monitoring. The file designation can indicate that the file is confidential and requires deletion upon completion of training of the machine learning model and project. The method also includes monitoring the file for an event that accesses the file, detecting a read access event occurring on the file, and determining a creation of a derivative file generated as a result of the read access event. The method further includes registering the derivative file into the reference table and indicating an association between the derivative file and the file in the reference table.

20 Claims, 4 Drawing Sheets

(56) References Cited

U.S. PATENT DOCUMENTS

| | | | | |
|---|---|---|---|---|
| 2021/0117377 A1* | 4/2021 | Savir | ................... | G06F 16/178 |
| 2021/0158089 A1* | 5/2021 | Nagai | ................... | G06V 10/25 |
| 2022/0035822 A1* | 2/2022 | Vannini | .............. | G06F 16/2358 |
| 2022/0318706 A1* | 10/2022 | Fan | ................ | G06Q 10/06311 |

OTHER PUBLICATIONS

Ginart, Antonio & Guan, Melody & Valiant, Gregory & Zou, James. (2019). Making AI Forget You: Data Deletion in Machine Learning. https://proceedings.neurips.cc/paper/2019/file/cb79f8fa58b91d3af6c9c991f63962d3-Paper.pdf.

Izzo, Zachary & Smart, Mary & Chaudhuri, Kamalika & Zou, James. (2020). Approximate Data Deletion from Machine Learning Models: Algorithms and Evaluations. https://www.researchgate.net/publication/339471355_Approximate_Data_Deletion_from_Machine_Learning_Models_Algorithms_and_Evaluations.

MLflow—A platform for the machine learning lifecycle, MLFLOW. com, https://mlflow.org/. Retrieved from the internet on Oct. 25, 2021.

Section: Linux Programmer's Manual (7), Updated Nov. 1, 2020, INOTIFY, https://linuxjm.osdn.jp/html/LDP_man-pages/man7/inotify.7.html. Retrieved from the internet on Feb. 7, 2022.

Y. Cao and J. Yang, "Towards Making Systems Forget with Machine Unlearning," 2015 IEEE Symposium on Security and Privacy, 2015, pp. 463-480, doi: 10.1109/SP.2015.35.

* cited by examiner

TRACKING TECHNIQUES FOR GENERATED DATA

BACKGROUND

The present disclosure relates to data management, and more specifically, to tracking data used for machine learning to ensure proper management and deletion of that data.

Machine learning models can work with data from many different sources. The data can have different characteristics, can be used for different purposes, and require different processing methods. These sources include, but are not limited to, user input data, system-generated data, user data, internal database, and third-party data. Certain data may contain confidential, private, restricted, personal, and/or subject to privacy laws. When dealing with such information, companies must be aware of the data they are handling and take steps to ensure they are in compliance with any agreements (e.g., non-disclosure) and laws (e.g., General Data Protection Regulation (GDPR)) that apply to that data, especially when no longer required, the data may be required to be deleted completely at the end of project in accordance with nondisclosure agreements.

During machine learning model development, data is selected and preprocessed to fit the chosen model that is best suited for the desired output of the machine learning model. Different types of algorithms require different amounts of labels as well as different amounts of computing power. This process requires experimenting with a wide range of datasets, data preparation steps, and algorithms to build a model that maximizes some target metrics.

SUMMARY

Embodiments of the present disclosure include a method of tracking data for, and generated by, machine learning to ensure accurate and precise deletion of the data. The method includes receiving a dataset for use in training a machine learning model and registering a file from the dataset into a reference table, wherein the file is designated for monitoring. The file designation can indicate that the file is confidential and requires deletion upon completion of training of the machine learning model and upon completion of the project. The method also includes monitoring the file for an event that accesses the file, detecting a read access event occurring on the file, and determining a creation of a derivative file generated as a result of the read access event. The method further includes registering the derivative file into the reference table and indicating an association between the derivative file and the file in the reference table.

Additional embodiments of the present disclosure include a computer program product that tracks data for and generated by machine learning to ensure accurate and precise deletion of the data, one or more computer-readable storage medium, and program instructions stored on the one or more computer-readable storage media, wherein the computer-readable instructions, when executed on a computing device, causes the computing device to receive a dataset for use in training a machine learning model and to register a file from the dataset into a reference table, wherein the file is designated for monitoring. The file designation can indicate that the file is confidential and requires deletion upon completion of training of the machine learning model and upon completion of the project. The computer program product also includes instructions that cause the computing device to monitor the file for an event that accesses the file, detect a read access event occurring on the file, and determine a creation of a derivative file generated as a result of the read access event. The computer program product further includes instructions that cause the computing device to register the derivative file into the reference table and indicate an association between the derivative file and the file in the reference table.

Further embodiments of the present disclosure include a system for tracking data for and generated by machine learning to ensure accurate and precise deletion of the data. The system includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
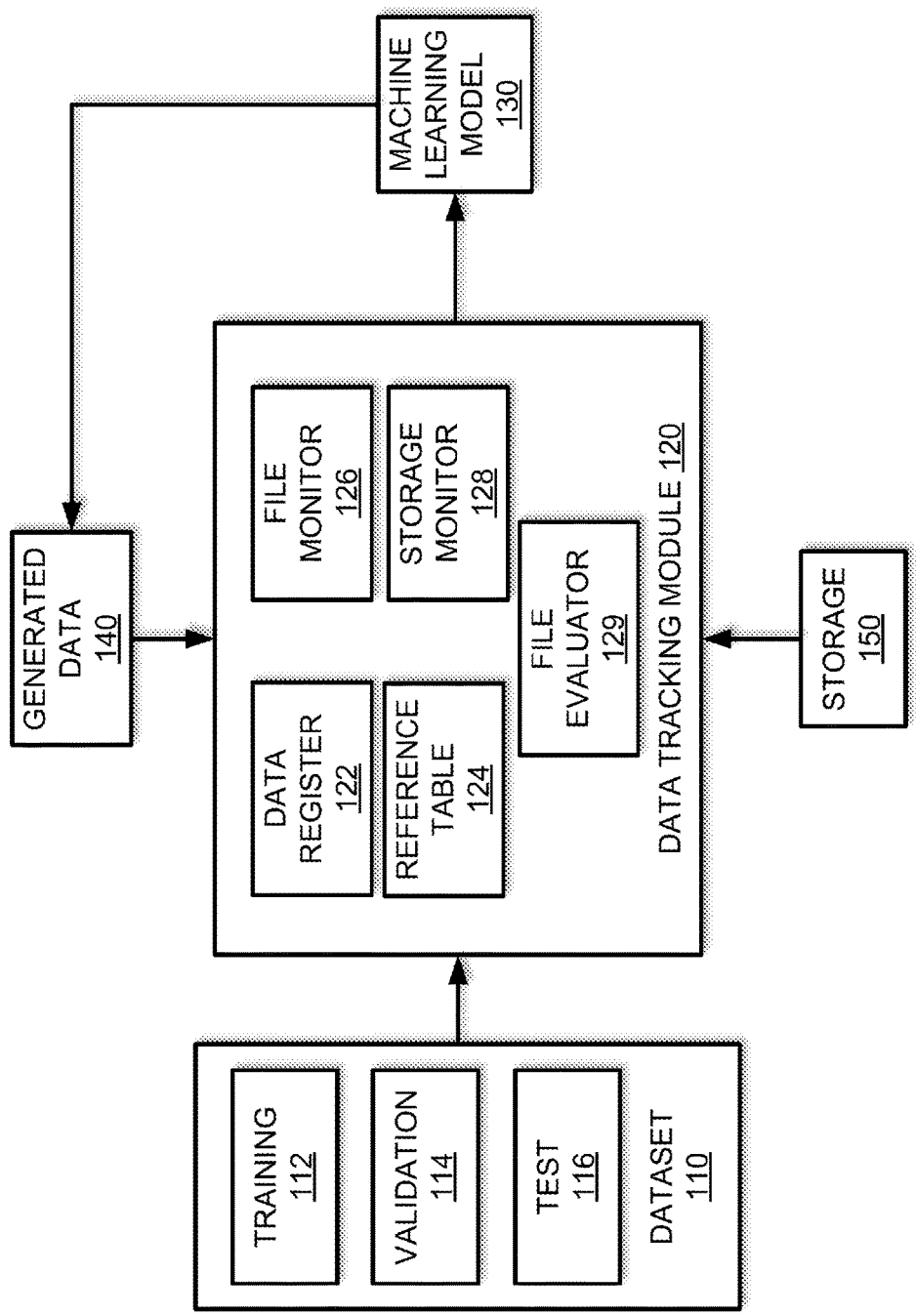
FIG. 1 is a block diagram illustrating an operation of the primary operational elements of a data tracking module used by one or more embodiments of the present disclosure.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to data management, and more specifically, to tracking data used for machine learning to ensure proper management and deletion of that data. While the present disclosure is not necessarily limited to such applications, various aspects of the disclosure may be appreciated through a discussion of various examples using this context.

Machine learning models can work with data from many different sources. The data can have different characteristics, can be used for different purposes, and require different processing methods. These sources include, but are not limited to, user input data, system-generated data, user data, internal database, and third-party data. Certain data may contain confidential, private, restricted, personal, and/or subject to privacy laws. When dealing with such information, companies must be aware of the data they are handling and take steps to ensure they are in compliance with any agreements (e.g., non-disclosure) and laws (e.g., GDPR) that apply to that data especially when no longer required, the data may be required to be deleted completely at the end of project in accordance with nondisclosure agreements.

Once a type of data is selected, it can be stored in a server or database. Typically, the data goes through a preprocessing stage in order to apply structure to at least part of the data for further analysis to prepare the data for use in machine learning. The preprocessing step can transform the data by applying new characteristics that describe the data. For instance, some characteristics include, but are not limited to, word/phrase count, the existence of certain special characters, relative length of the text, outlines of certain objects, and the like. This process can generate derivative forms of the original raw data.

Once preprocessed, a common practice is to split the dataset into a training dataset, a validation dataset, and a test dataset. The idea is to have a set that trains the machine learning model, a second dataset to validate the results of the training, and a third dataset to test the model. At the test step of the training process, derivate data based on the original data is generated, such as files including predicted labels, and the like. For example, the machine learning model can generate a predicted label for each sample inputted into the model. The label can be seen as derivative data of the original data.

During usage, data is extracted and is either transformed into another format or produces another piece of information. For example, a training sample inputted into a machine learning model produces an approximation, or predicted label, for that training sample. That information is then returned to storage during the training process.

Limitations on data handling remain, however, as data management policies fail to account for derivate, or generated, data produced when creating and training a machine learning model. The data used to train a machine learning model may have requirements that specify that the data is to be deleted upon completion of the project. Sample data and generated data, based on that original data, also required deletion. Additionally, data management policies may not necessarily account for the various types of data being used. For instance, training data may include data in image and video formats, label data in the text formats, prediction models in binary formats, evaluation results in image and text formats, and the like. Data tracking can overlook these various forms of generated data, resulting in a failure to properly delete all data when a project is completed.

The reasoning why data is overlooked can include, as mentioned, the sheer amount of generated data is difficult to track. For instance, during evaluation, several results are generated to investigate the causes of potential prediction errors and to improve accuracy. Also, the original data may be raw and unprocessed, requiring data scientists to preprocess and generate modified forms of the original data. In addition, there can be time constraints, such as when a client often requires a final evaluation report within weeks or months. This can result in data scientists performing ad-hoc data management techniques that can overlook data that requires deletion. When data is not properly deleted, a breach of contract may result (e.g., non-disclosure) and/or result in violations of data privacy laws.

Embodiments of the present disclosure may overcome the above, and other problems, by providing a system and method that centrally manages datasets used for the training and evaluation of machine learning models as well the data generated during those processes. Once a project is complete, embodiments can provide mechanisms for the proper deletion of all data related to the project. At the beginning of a project, the data requiring deletion at the end of the project are marked and registered. During the training and evaluation process, file system events are monitored to determine when data is accessed, used, changed, deleted, and moved. Any resulting derivative data that is generated from this data are also registered. Upon completion of the project, all registered data can be efficiently deleted.

More specifically, a data tracking module stores a reference table that stores identifications of data that require deletion (e.g., confidential, private, secret, personal data). The data tracking module includes a process monitor that can monitor any activity or events that access the data referenced in the reference table. When derivative data is generated as a result of the access, the data tracking module can add identifications of the derivative data into the reference table. Additionally, a link can be created between the derivative data and the original data that indicates a relationship or association between the two.

Derivative files can take the form of various forms of generated data. This generated data includes, but is not limited to, datasets obtained through preprocessing such as correction and noise elimination techniques applied to the original dataset, prediction model files prepared based on the training data, and evaluation results files obtained from using a prediction model with evaluation data.

By way of example, but not by limitation, company A provides data that it wishes to use to create a machine learning model that can generate an accurate prediction based on the data. The data, however, contains confidential information that company A places into a non-disclosure agreement. The agreement requires that confidential data be deleted at the end of the project. The data tracking module can register the confidential data contained with the received dataset in a reference table. During the training process of the prediction model, any derivative data generated as a result of accessing the confidential data is also registered within the reference table. When the project is completed, the reference table can be referenced to determine all confidential data, and any derivative data from that confidential data, and delete those files in accordance with the non-disclosure agreement.

In some embodiments, when a monitored file is read, via a read instruction or the like, the data tracking module monitors the action via a file monitor. If a new file is created as a result of the read instruction, that new file is evaluated to see if the format of the new file corresponds to any file within the dataset, machine learning model, or evaluation result. If that file corresponds or relates to, those files, then the new file is added to the reference table so that it can also be monitored. Additionally, a link is generated between the originally read file and the newly created file to indicate that the two files are related or associated with each other.

In some embodiments, when a monitored file is remotely copied, via a copy instruction or the like, the data tracking module transmits a notification that the copied file requires registration on the system that remotely copied the file. Thus, when the system that remotely copies the monitored file receives that file, the data tracking module operating on that system can create a new entry for the file in its respective reference table.

In some embodiments, when the system operating the data tracking module requires additional storage space, the monitored file with the oldest access time is retrieved. A list can be electronically transmitted and presented to an administrator via a monitor that displays that file and all associated files. The administrator can make a determination as to which files they wish to retain and which files they choose to delete. Upon that determination, the data tracking module can delete the files designated for deletion.

FIG. 1 is a block diagram illustrating a machine learning environment 100 that includes a data tracking module 120 for tracking data for, and generated by, training machine learning models. The machine learning environment 100 includes a dataset 110, a data tracking module 120, a machine learning model 130, generated data 140, and storage 150. The data tracking module 120 includes a data register 122, a reference table 124, a file monitor 126, a storage monitor 128, and a file evaluator 129. For purposes of the present description, it will be assumed that the illustrative embodiments are being implemented as part of a computing system and specifically on a computing system configured to train machine learning models. However, this is only one possible implementation and is not intended to be limiting on the present disclosure. Other implementations in which virtual machines and/or containers are utilized may also be used without departing from the spirit and scope of the present disclosure.

The dataset 110 is a set of data compiled to train the machine learning model 130. The dataset 110 can include a collection of samples. Each sample contains one or more features and a label. For example, the dataset 110 may include a collection of photo samples. Each of the samples can include a label that indicates whether a vehicle is present within the photograph or not. The features are input variables relating to the sample and are used to make a prediction on a label. The features can be weighed and adjusted by a model to assist in making an accurate prediction on a label.

The dataset 110 can be in the form of training data or converted into a training set through annotation and preprocessing. Once in the form of training data, the dataset 110 can include a collection of samples, with each sample containing one or more features and a label. In some embodiments, the dataset 110 is divided into a training dataset 112, a validation dataset 114, and a test dataset 116. The validation dataset 114 can be a subset of the existing dataset 110 for use in validating a pseudo labeled dataset. The test dataset 116 is a subset of the existing dataset 110 used to test the machine learning model 130 after training and validation. The dataset 110 can also randomize selecting the training dataset 112, validation dataset 114, and the test dataset 116 selections to prevent overfitting by the machine learning model 130.

The data tracking module 120 is a component of the machine learning environment 100 configured to track data tracking data for, and generated by, the machine learning model 130, in accordance with embodiments of the present disclosure. The data tracking module 120 includes a data register 122, a reference table 124, a file monitor 126, a storage monitor 128, and a file evaluator 129.

The data register 122 is a component of the data tracking module 120 configured to register data into a reference table 124. As data is received into the machine learning environment 100, the data register 122 can inspect the data, and any data that is marked as requiring monitoring can be inputted into the reference table. In some embodiments, the data is tagged with a mapping and indicator through methods such as global ontology-based data access and unique file identifier. The data indicators of the data designated for monitoring can be inputted into the reference table 124 to ensure that the data is tracked.

The reference table 124 is a component of the data tracking module 120 configured to store references marked for monitoring. While shown in FIG. 1 as a table, the reference table 124 can be a mapping, database, journal, metadata, and the like. The reference table 124 can include information that provides the data tracking module 120 as to what data is being monitored and where that data is stored in the storage 150. Additionally, the reference table 124 can also store links between originally monitored data and derivative data generated as a result of accessing the original data.

The file monitor 126 is a component of the data tracking module 120 configured to monitor the data files relating to the data referenced in the reference table 124. The file monitor 126 can utilize mechanisms that monitor a file system event as they relate to the data that is being monitored. The file monitor 126 is also configured to monitor directories in which the data is stored. When an event occurs within the directory, the file monitor 126 can receive a notification. During the monitoring process, the file monitor 126 can monitor for events that include, but are not limited to, file accesses (e.g., read), file attribute changes, writes, create, delete, modify, move, and open. When monitoring data, an event can be generated for activity on any link that references the data.

The storage monitor 128 is a component of the data tracking module 120 configured to monitor the available storage allocated to the data tracking module 120 within the storage 150. The storage monitor 128 can detect when a storage capacity threshold has been reached within the storage 150 storing the dataset 110 all other related data. Upon detection of the threshold being reached, the storage monitor 128 can determine the file registered within the reference table 124 with the longest time since an access has occurred. This can indicate that the file is no longer in use by the machine learning environment 100 and can potentially be deleted. In addition to determining the least used file, any derivative files relating to that file can also be compiled. The list with those files can be transmitted for evaluation by an administrator.

Once an administrator examines the files, they can authorize which files can be deleted and which files should remain in storage 150. Upon receiving an indication from the administrator, the storage monitor 128 can delete the files marked for deletion. Additionally, any derivative files relating to the marked files can also be deleted.

The file evaluator 129 is a component of the data tracking module 120 configured to evaluate generated files to determine if they are derivative data. When a process that generated an event on a file marked for monitoring writes a file, the file evaluator 129 can examine that file and determine whether that file was generated as a result of the machine learning workflow. For example, these files include training data, models, evaluation results, generated data 140 (e.g., images, spreadsheets, text files, log files). When the file evaluator 129 determines that the file relates to the machine learning workflow, that new file can be registered and added to the reference table 124. Additionally, a link can be created that references the relationship between the new file and the data that was originally accessed that resulted in the creation of that file.

The machine learning model 130 is a component of the machine learning environment 100 configured to learn from training data and assign labels to unlabeled datasets once trained. The machine learning model 130 is further configured to adjust the parameters and weights of features during the training cycle. The machine learning model 130 can perform predictive analyses, spam detection, pattern detection, image classification, other types of categorical classifications, as well as logistic regressions. The machine learning model 130 can employ different algorithmic methods and techniques to map and label the inputted data. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can implement techniques such as K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage, and selection operator (LASSO), elastic net, least-angle regression (LARS), probabilistic classifier, naïve Bayes classifier, and binary classifier.

In some embodiments, the machine learning model 130 implements deep learning techniques based on artificial neural networks. Deep learning techniques include deep neural networks, deep belief networks, recurrent neural networks, and convolutional neural networks. Deep learning applies techniques that implement multiple layers to progressively extract higher-level features from the input.

The machine learning model 130 is further configured to provide a logistic regression type model. This model type can generate a prediction probability for each label predicted. For example, if the machine learning model 130 predicts an email as spam, that prediction is accompanied with a prediction probability or confidence level, the machine learning model 130 has in providing that prediction. The prediction probability can be a percentage ranging from 0 to 100%, depending on the confidence of the machine learning model 130. It should be noted that other forms of prediction probability can also show the confidence level of a predicted label. As the machine learning model 130 is trained, its prediction probabilities can also increase.

The generated data 140 is a set of data generated by the machine learning model 130 or generated as a result of the training and evaluation process of the machine learning model 130. The generated data 140 can include labels produced by the machine learning model 130, a collection of samples with each sample containing one or more features and a label, documentation of the testing results, probability assessments produced, as well any other data that stems from testing the machine learning model 130. For example, the generated data 140 can include labeled samples produced by the machine learning model 130 and are being stored to determine the accuracy and efficiency of the predictions. The samples can include approximate labels and accompanying prediction probabilities provided by the machine learning model 130.

The storage 150 is a component of the machine learning environment 100 configured to store and manage the input and output of data to and from the machine learning model 130. Examples of storage 150 include tape systems (e.g., tape drives, tape autoloaders, tape libraries), disk systems, flash systems, hybrid systems, storage arrays, magnetic drives, solid-state drives, and optical drives. In some embodiments, the storage 150 is part of a storage environment 105, including storage servers (e.g., block-based storage), direct-attached storage, file servers, server-attached storage, network-attached storage, or any other storage solution. In some embodiments, the components of the storage environment comprise a distributed architecture. For example, the storage environment can comprise multiple storage 150 systems physically located at different locations but are able to communicate over a communication network to achieve the desired result.

It is noted that FIG. 1 is intended to depict the representative major components of an exemplary machine learning environment 100 and data tracking module 120. In some embodiments, individual components may have greater or less complexity than as represented in FIG. 1, components other than or in addition to those shown in FIG. 1 may be present, and the number, type, and configuration of such components may vary.

Thus, illustrative embodiments provide mechanisms for tracking data generated during the training of machine learning models. Thus, when a project is complete, and all testing has been performed on a machine learning model, data that requires deletion can be efficiently and accurately deleted. In addition, any derivative data that resulted from the usage of the original data can also be deleted. Additionally, the mechanisms of the illustrative embodiments may include operation with other development systems and/or other downstream computing systems to perform actions that ensure the proper deletion of data after usage, which may include outputting notifications, via user interfaces that may provide functionality for manually selecting data for deletion.

Figure 2:
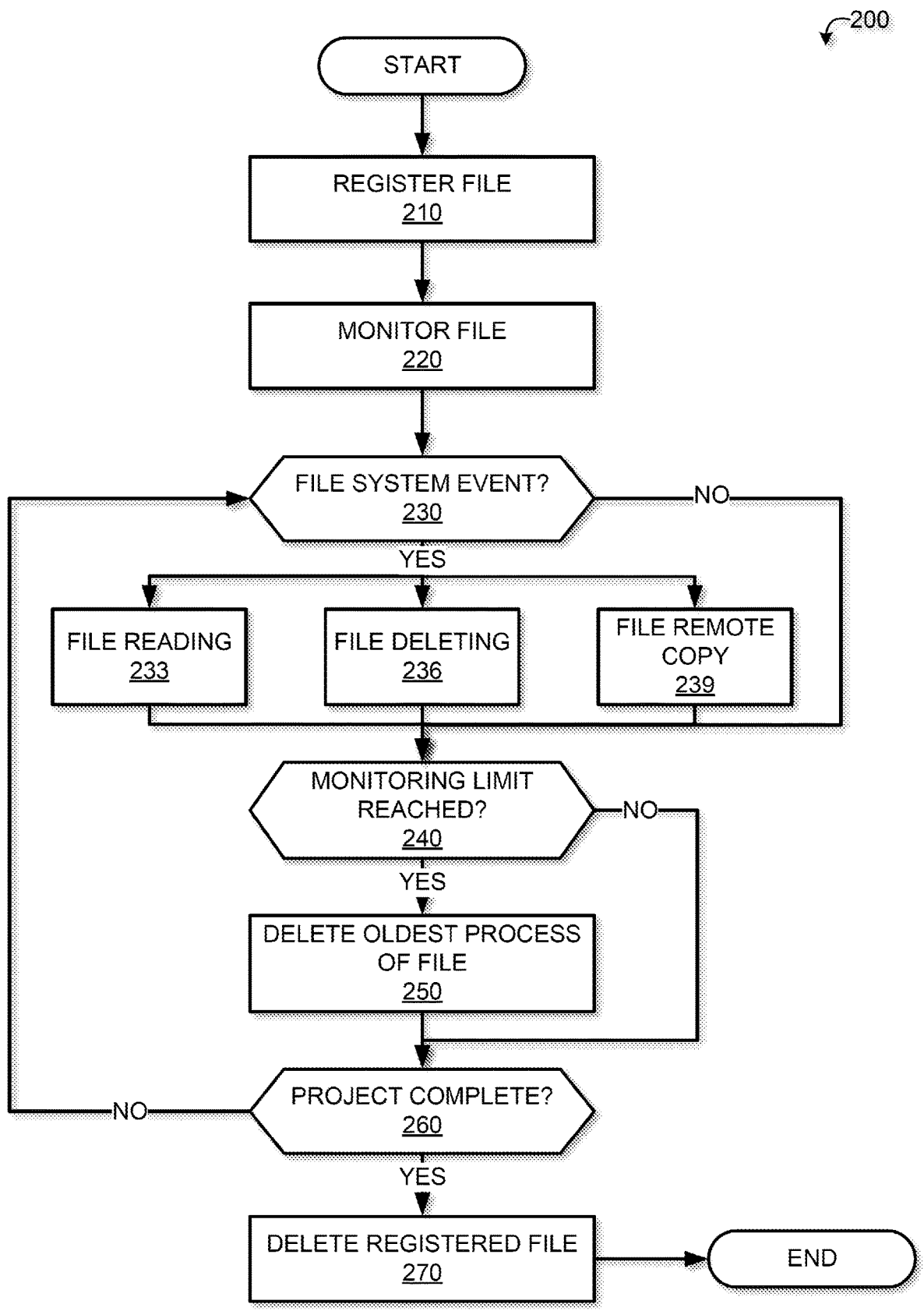
FIG. 2 is a flow diagram illustrating a process of tracking monitored and generated data used in machine learning to determine what data should be deleted upon completion of a project and performed in accordance with embodiments of the present disclosure.

FIG. 2 is a flow diagram illustrating a process 200 of tracking data generated for machine learning, in accordance with embodiments to the present disclosure. As shown in FIG. 2, the process 200 beings by the data register 122 registering the data files that require monitoring. This is illustrated at step 210. As data is received into the machine learning environment 100, the data register 122 can inspect the data, and any data that is marked as requiring monitoring can be inputted into the reference table. The reference table 124 can include information that provides the data tracking module 120 as to what data is being monitored and where that data is stored in the storage 150.

In some embodiments, the data register 122 parses the dataset into separate files. The data register 122 can inspect each of the separate files for information that can indicate that the file requires monitoring. The information can include personal information, confidential information, personally identifiable information, trade secrets, privileged information, information protected under statutes, and the like. Natural language processing techniques can be used to assist in determining which files should be monitored. Once inspected, any files found to contain information that may need monitoring is registered into the reference table 124.

The file monitor 126 monitors the data files registered in the reference table 124. The file monitor 126 can utilize mechanisms that monitor a file system event as they relate to the data that is being monitored. During the monitoring process, the file monitor 126 can monitor for events that include, but are not limited to, file accesses (e.g., read), file attribute changes, writes, create, delete, modify, move, and open. If an event occurs to a monitored file, the file monitor 126 can determine the type of event being performed and respond accordingly. This is illustrated at step 230.

In the event of a read event, the file monitor 126 can monitor for additional activity performed on the file. This is illustrated at step 233. This step is discussed in greater detail in FIG. 3. In the event of a delete event, the file monitor 126 detects a delete access event occurring on a monitored file.

This is illustrated at step 236. That file can be deleted from the storage 150. Additionally, the data register 122 can remove the entry in the reference table 124 that corresponds to the deleted file. In some embodiments, derivative files relating to the deleted file are also deleted. For example, an original file is marked for monitoring. During the machine learning workflow, the original file generates three additional files that are derivatives. The three derivative files can also be deleted when the original file is deleted.

In the event of a remote file copy event, the file monitor 126 can monitor the file to determine the destination and the remote workstation that is copying the file. This is illustrated at step 239. The file monitor 126 can transmit a notice to the remote workstation that the copied file is being monitored and is registered in the reference table 124. The notice, or indicator, can also inform the remote workstation to register the file in their respective reference table 124 that is locally stored.

The storage monitor 128 determines whether a monitoring limit is reached. This is illustrated at step 240. The monitoring limit relates to a storage capacity threshold. The storage monitor 128 can detect when a storage capacity threshold has been reached within the storage 150, storing the dataset 110 all other related data. Upon detection of the threshold being reached, the storage monitor 128 can determine the file registered within the reference table 124 with the longest time since an access has occurred. This can indicate that the file is no longer in use by the machine learning environment 100 and can potentially be deleted. This is illustrated at step 250. In addition to determining the least used file, any derivative files relating to that file can also be compiled. The list with those files can be transmitted for evaluation by an administrator.

A determination is made as to whether the machine learning training project is complete. This is illustrated at step 260. If training and evaluation on the machine learning model 130 is still being conducted, the process 200 returns to step 230 and continues to monitor the files registered in the reference table 124. However, if the project is complete, the files referenced in the reference table 124, as well as any derivative files, are deleted from the storage 150. This is illustrated at step 270.

Figure 3:
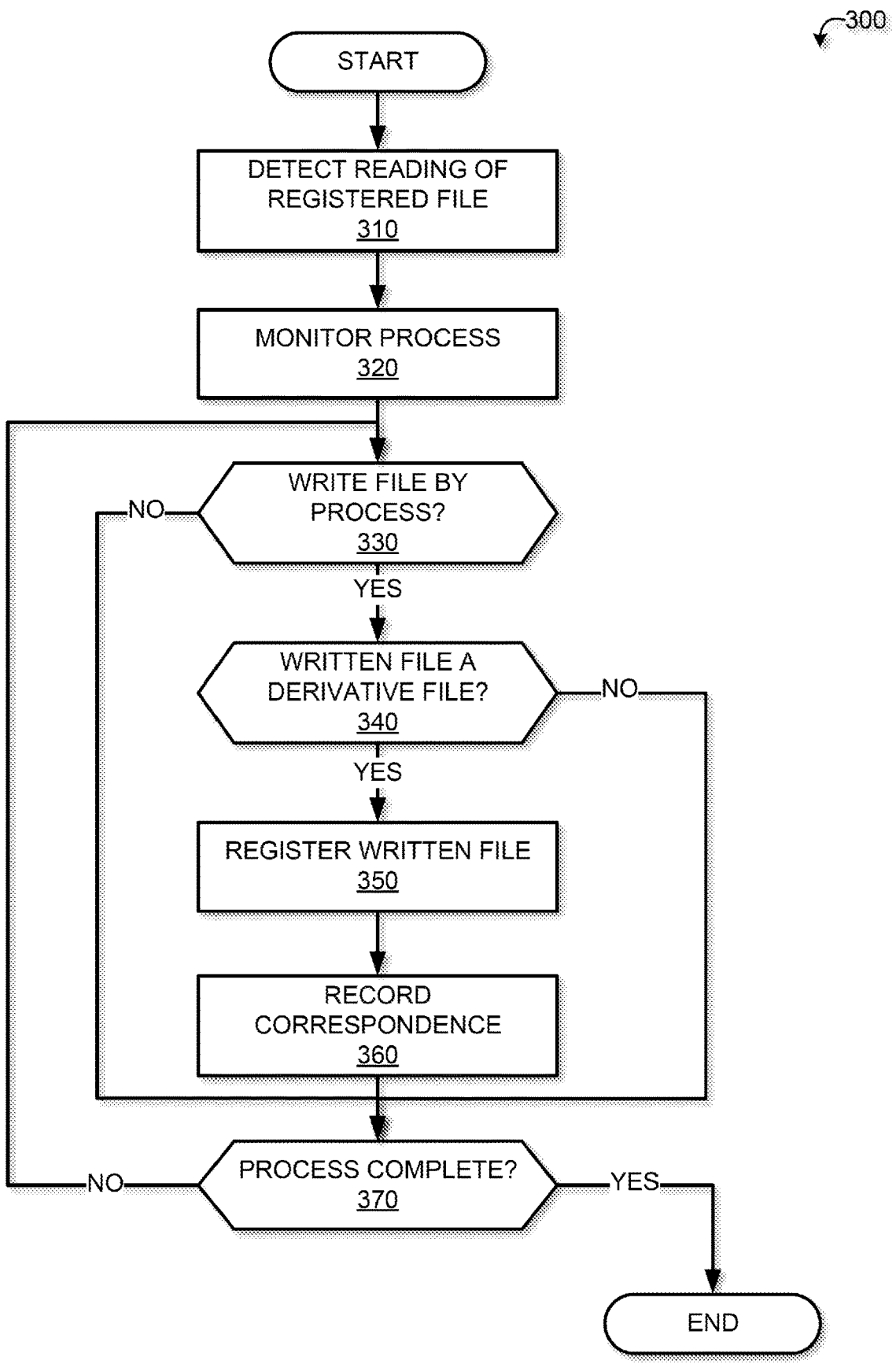
FIG. 3 is a flow diagram illustrating a process of detecting a read access event occurring on a monitored file and performed in accordance with embodiments of the present disclosure.

FIG. 3 is a flow diagram illustrating a process 300 of detecting a read access event, in accordance with embodiments of the present disclosure. Process 300 is substantially similar to step 233 of FIG. 2. As shown in FIG. 3, the process 300 begins by the file monitor 126 detecting a read access event occurring to the file registered in the reference table 124. This is illustrated at step 310. The file monitor 126 can monitor the process performing the read access event. This is illustrated at step 320.

When the file monitor 126 detects activity occurring, a determination can be made as to whether a write operation was performed by the process. This is illustrated at step 330. In the event that a write operation was performed, the file evaluator 129 can evaluate the generated file to determine if it is a derivate file of the file being accessed. When a process that generated an event on a file marked for monitoring writes a file, the file evaluator 129 can examine that file and determine whether that file was generated as a result of the machine learning workflow. This Is illustrated at step 340 For example, these files include training data, models, evaluation results, and generated data 140. If the file evaluator 129 determines that the file relates to the machine learning workflow, that new file can be registered and added to the reference table 124. This is illustrated at step 350. Additionally, a link can be created that references the relationship between the new file and the data that was originally accessed that resulted in the creation of that file. This is illustrated at step 360.

A determination is made as to whether the process is still performing computation as a result of the read access to the file being monitored. This is illustrated at step 370. If the process has finished, then process 300 is complete. However, if the process is still performing computation, the process 300 returns to step 330 and continues to monitor the process to see if any additional write files are generated.

Figure 4:
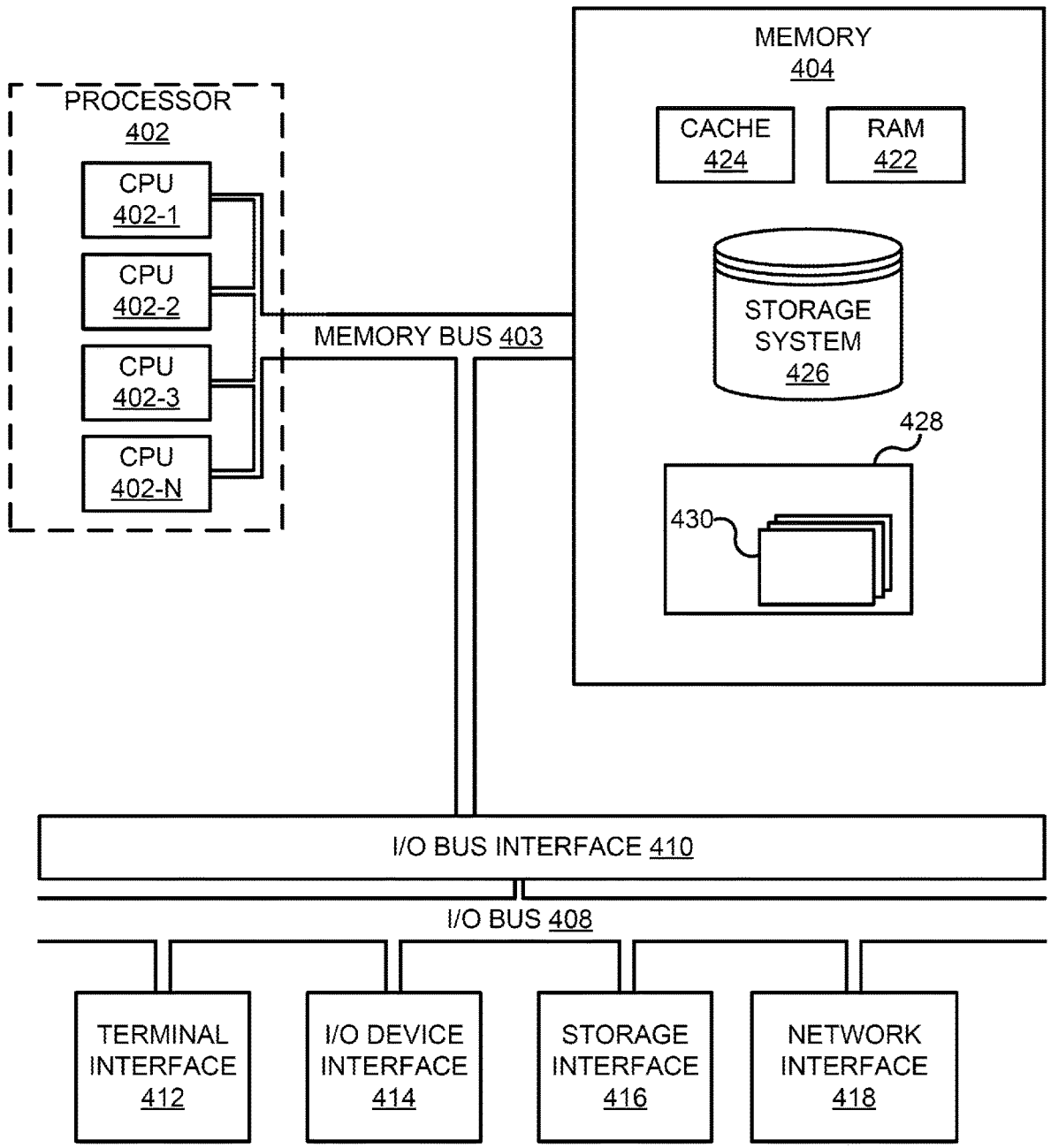
FIG. 4 is a high-level block diagram illustrating an example computer system that may be used in implementing one or more of the methods, tools, modules, and any related functions, described herein in which the disclosure may be implemented.

Referring now to FIG. 4, shown is a high-level block diagram of an example computer system 400 (e.g., the machine learning environment 100, the data tracking module 120) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 402 may execute instructions stored in the memory 404 and may include one or more levels of onboard cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments, some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the machine learning environment 100, the data tracking module 120), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of tracking data generated for machine learning, the computer-implemented method comprising:
   receiving a dataset for use in training a machine learning model;
   determining that a file of the dataset comprises deletion data, wherein the deletion data is associated with an agreement to delete the deletion data;
   in response to determining the file comprises the deletion data, registering the file from the dataset into a reference table, wherein the file is designated for monitoring by storing an indicator of where the file is stored;
   monitoring the file for an event that accesses the file;
   detecting a read access event occurring on the file;
   determining a creation of a derivative file generated as a result of the read access event;
   registering the derivative file into the reference table by storing a link between the file and the derivative file; and
   indicating an association between the derivative file and the file in the reference table.

2. The computer-implemented method of claim 1, further comprising:
   detecting a storage limit threshold within a storage system storing the dataset and other files related to the training of the machine learning model;
   determining a second file registered within the reference table with a longest time since an access occurred;
   compiling a list include the second file and derivative files relating to the second file;
   transmitting the list for evaluation by an administrator;
   receiving, from the administrator, indication to delete the second file; and
   deleting the second file and the derivative files.

3. The computer-implemented method of claim 1, further comprising:
   monitoring the file for another event that accesses the file;
   detecting a delete access event occurring on the file;
   deleting the file from a storage system storing the file; and
   removing the registration of the file in the reference table.

4. The computer-implemented method of claim 3, wherein the derivative file related to the file is also deleted.

5. The computer-implemented method of claim 1, further comprising:
   monitoring for another event that accesses the file;
   detecting a remote file copy event occurring on the file from a remote workstation; and
   transmitting an indicator to the remote workstation to register the file in the reference table stored on the remote workstation.

6. The computer-implemented method of claim 1, wherein the derivative file is a type of file selected from the group consisting of a preprocessing file, a training file, and an evaluation file.

7. The computer-implemented method of claim 1, wherein determining the creation of the derivative file comprises:
   detecting a creation of a second file during the read access event of the file;
   evaluating a file type of the second file;
   determining the second file relates to the training of the machine learning model and an evaluation of the machine learning model; and
   determining the second file is a derivative of the file.

8. The computer-implemented method of claim 1, further comprising:
   parsing, upon receiving the dataset, the dataset into separate files;
   inspecting each of the separate files for information that requires monitoring; and
   registering files with the information that requires monitoring into the reference table by storing an indicator of where the registering files are stored.

9. The computer-implemented method of claim 1, wherein the file includes confidential and private information.

10. An apparatus comprising:
    a processor; and a memory coupled to the processor, wherein the memory comprises instructions which, when executed by the processor, cause the processor to:

receive a dataset for use in training a machine learning model;

determine that a file of the dataset comprises deletion data, wherein the deletion data is associated with an agreement to delete the deletion data;

in response to determining the file comprises the deletion data, register the file from the dataset into a reference table, wherein the file is designated for monitoring by storing an indicator of where the file is stored;

monitor the file for an event that accesses the file;

detect a read access event occurring on the file;

determine a creation of a derivative file generated as a result of the read access event;

register the derivative file into the reference table by storing a link between the file and the derivative file; and indicate an association between the derivative file and the file in the reference table.

11. The apparatus of claim 10, further comprising:

detect a storage limit threshold within a storage system storing the dataset and other files related to the training of the machine learning model;

determine a second file registered within the reference table with a longest time since an access occurred;

compile a list include the second file and derivative files relating to the second file;

transmit the list for evaluation by an administrator;

receive, from the administrator, indication to delete the second file; and delete the second file and the derivative files.

12. The apparatus of claim 10, further comprising:

monitor the file for another event that accesses the file;

detect a delete access event occurring on the file;

delete the file from a storage system storing the file; and remove the registration of the file in the reference table.

13. The apparatus of claim 10, further comprising:

monitor for another event that accesses the file;

detect a remote file copy event occurring on the file from a remote workstation; and transmit an indicator to the remote workstation to register the file in the reference table stored on the remote workstation by storing the indicator of where the file is stored.

14. The apparatus of claim 10, wherein the instructions that cause the processor to determine the creation of the derivative file comprises instructions that cause the processor to:

detect a creation of a second file during the read access event of the file;

evaluate a file type of the second file;

determine the second file relates to the training of the machine learning model and an evaluation of the machine learning model; and determine the second file is a second derivative of the file.

15. A computer program product comprising a computer readable storage medium having computer readable instructions stored therein, wherein the computer readable instructions, when executed on a computing device, causes the computing device to:

receive a dataset for use in training a machine learning model;

determine that a file of the dataset comprises deletion data, wherein the deletion data is associated with an agreement to delete the deletion data;

in response to determining the file comprises the deletion data, register the file from the dataset into a reference table, wherein the file is designated for monitoring by storing an indicator of where the file is stored;

monitor the file for an event that accesses the file;

detect a read access event occurring on the file;

determine a creation of a derivative file generated as a result of the read access event;

register the derivative file into the reference table by storing a link between the file and the derivative file; and indicate an association between the derivative file and the file in the reference table.

16. The computer program product of claim 15, further comprising instructions that cause the device to:

detect a storage limit threshold within a storage system storing the dataset and other files related to the training of the machine learning model;

determine a second file registered within the reference table with a longest time since an access occurred;

compile a list include the second file and derivative files relating to the second file;

transmit the list for evaluation by an administrator;

receive, from the administrator, indication to delete the second file; and delete the second file and the derivative files.

17. The computer program product of claim 15, further comprising instructions that cause the device to:

monitor the file for another event that accesses the file;

detect a delete access event occurring on the file;

delete the file from a storage system storing the file; and remove the registration of the file in the reference table.

18. The computer program product of claim 15, further comprising instructions that cause the device to:

monitor for another event that accesses the file;

detect a remote file copy event occurring on the file from a remote workstation; and transmit an indicator to the remote workstation to register the file in the reference table stored on the remote workstation by storing the indicator of where the file is stored.

19. The computer program product of claim 15, wherein the derivative file is a type of file selected from the group consisting of a preprocessing file, a training file, and an evaluation file.

20. The computer program product of claim 15, wherein determining the creation of the derivative file comprises instructions that cause the device to:

detect a creation of a second file during the read access event of the file;

evaluate a file type of the second file;

determine the second file relates to the training of the machine learning model and an evaluation of the machine learning model; and determine the second file is a second derivative of the file.

* * * * *